INVENTOR
OTTO WEITZ
BY Edwin E. Greigg
ATTORNEY

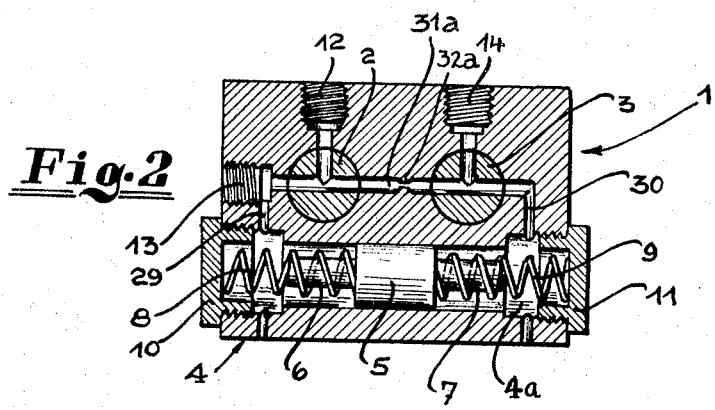
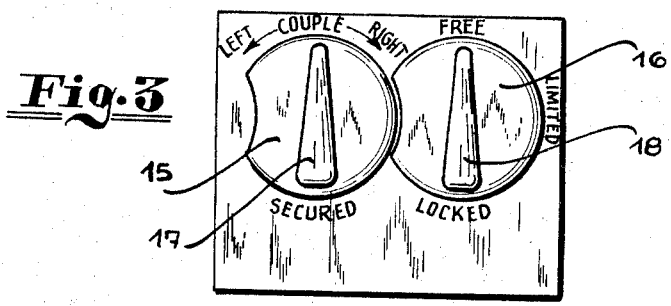
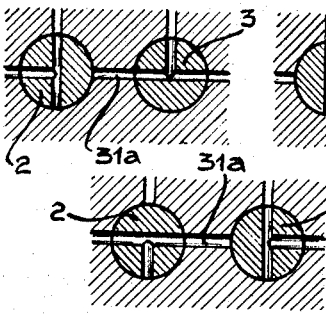
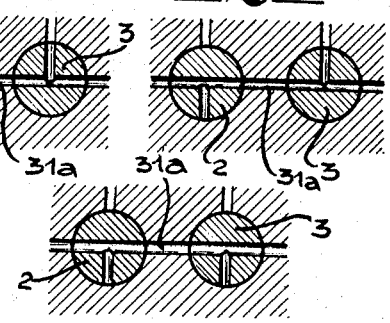
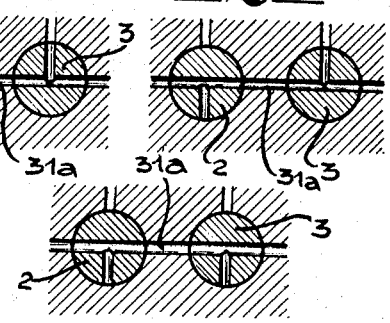

United States Patent Office 3,425,715
Patented Feb. 4, 1969

3,425,715
HYDRAULICALLY CONTROLLED HITCH
Otto Weitz, Butzbach, Hesse, Germany, assignor to A. J. Troster, Butzbach, Hesse, Germany, a company of Germany
Filed Apr. 14, 1967, Ser. No. 630,893
Claims priority, application Germany, Apr. 14, 1966, T 30,909; Aug. 9, 1966, T 31,793
U.S. Cl. 280—479
Int. Cl. B60d 1/16, 1/00; A01b 51/00
16 Claims

ABSTRACT OF THE DISCLOSURE

A hydraulic control system associated with the draft links of hitches, preferably of the three-point type, wherein the coupling parts are of such a structure that coupling and uncoupling is achieved by a substantially horizontal swinging motion of the draft links. The said system includes two hydraulic cylinders one of each connected to each draft link, a valve assembly adapted to be set into a plurality of switching positions to achieve independently at least some of the following operational features: (a) swinging the links simultaneously or selectively inwardly (towards one another) for coupling; (b) swinging the links outwardly (away from one another) for uncoupling; (c) permitting the links to swing freely or to a limited extent in unison when coupled to an implement and when submitted to random external forces; and (d) locking the links (preventing any swinging) in any position they may assume after being coupled to an implement.

FIELD OF THE INVENTION

This invention relates to a hydraulic control system particularly for three-point hitches used generally to couple an agricultural implement to a tractor. The inventive control system is associated with the draft links of a three-point hitch.

The known hitch mechanism in which the present invention may find most advantageous application comprises a left and a right draft link, the leading ends of which are swingably attached to a tractor while their trailing ends are adapted to be slid onto coupling stubs secured to the implement. These hitches usually also include upper links with which, however, this invention is not concerned and consequently their presence in or absence from the hitches is of no significance as to the applicability of the present invention.

Depending upon the working conditions or the particular implement used, it may be desired that after the coupling operation has been completed and during towing, the draft links swing laterally in unison with the largest possible amplitude restricted only by the structural limitations of ball joints or other connecting parts. Such a requirement is imposed upon hitches for hoeing machines to enable such implements to be advanced with a substantial freedom of lateral movement with respect to the tractor. In some instances, however, for example when the implement is a plow, a more limited sidewise swing is required. Finally, it is very often essential that no free lateral movement whatever should occur, that is, the implement should follow the tractor in a pre-set lateral position.

The hydraulic system of this invention is adapted to control the motion of the draft links for the purposes outlined above.

DESCRIPTION OF THE PRIOR ART

A typical hitch, particularly for heavy agricultural implements, comprises draft links, the trailing end of which is provided with an upwardly directed hook. Or, an additional member is used which is attached to the trailing end of the draft links and sometimes to the upper or control link of the three-point hitch and is provided with an upwardly directed hook.

For executing the coupling operation with either of the above-noted two structures, the operator backs up his tractor until the trailing end of the draft links along with the hooks thereon is positioned under the coupling stubs fixedly secured to the implement. By means of the hydraulic system of the tractor the draft links are raised and the hooks are caused to couple with the stubs. The hooks are usually provided with guide faces to cancel out a possible difference between the positions of the hooks with respect to the stubs during lifting. After hitching the draft links, the trailing end of the upper link is connected with the corresponding part on the implement.

The precedingly-described coupling process by means of hooks has a number of disadvantages:

About and particularly under the coupling stubs a substantial free space is required to accommodate the hooks when the tractor is being backed up. The aforenoted guide faces of the hooks also require a substantial amount of space. It is therefore often required to secure the coupling stubs to the implement substantially spaced therefrom in a forward direction in order to obtain the necessary free space. Such a positioning of the coupling stubs results in a highly undesired substantial relief of the rear axle of the tractor when the implement is lifted. In case of short and tall implements, like for example seeding machines, there is a danger that the implement turns over backward when lifted, particularly if it has to be brought into the correct position by means of the guide faces. This may be a frequent source of accidents. Further, in the so-called quick couplings there is, due to the hook structure, a relatively large bearing play between the hook on the tractor and the coupling stub on the implement. If the aforenoted additional part is, for example, a quick coupling frame which is not a permanent part of the draft link but is attached removably to the trailing end thereof, there is additional undesired bearing play at these joints between the draft link and the additional part. If a hydraulic control mechanism of the tractor is being used, as is the case nowadays almost exclusively when plows are used, then the aforenoted play at the joints between the draft links and the implement may adversely affect the control operation.

It is further known to use stabilizing or locking devices for the draft links of a three-point hitch. In these cases, a special truss frame or a chain is used. These known devices, however, are disadvantageous in that they can be operated only with difficulty, if at all, from the tractor seat due to their position under the rear axle of the tractor. In this position they are highly exposed to soiling which causes a rapid corrosion particularly of the tensioning chain locks. The most serious disadvantage of the known stabilizing devices lies in that they lock the draft links either against any lateral movement or permit only a limited lateral motion. The adjustment of these devices from one possibility to the other is difficult and time-consuming. Furthermore, these known stabilizing devices have to be removed entirely if it is desired that the draft links have a total freedom of lateral motion.

Principal objects of the invention

In order to obviate the disadvantages set forth hereinabove, it is an object of the invention to provide an improved, hydraulically controlled hitch to facilitate the coupling and uncoupling of an implement to or from a tractor, respectively.

It is another object of the invention to provide improved hydraulic means to permit a freedom of maximum lateral swing in unison of the draft links of a hitch device after the coupling operation between tractor and implement has been completed.

It is a further object of the invention to provide improved hydraulic means to restrict to predetermined limits the simultaneous and unidirectional swing of the draft links of a hitch after coupling has been established between tractor and implement.

It is still another object of the invention to provide improved, hydraulic means to lock the draft links of a hitch in any lateral position to prevent any further lateral displacement thereof.

A still further object of the invention is to provide improved hydraulic means adapted to selectively execute at least two of the aforenoted operations on command by an operator from his tractor seat.

Still another object of the invention is to provide an improved hydraulic means to dampen the lateral motion of the draft links in unison.

Summary of the invention

According to the invention, each draft link of an aforenoted three-point hitch is connected to a separate hydraulic cylinder hydraulically joinable to one another as well as to a pump or a reservoir by means of an improved hydraulic circuit which includes a valve assembly comprising a plurality of distributor and shut-off valves manually settable to a plurality of positions.

Some or all of the following control operations may be achieved by appropriate valve settings:

(a) Admission of hydraulic pressure into or removal form either or both hydraulic cylinders associated with the draft links to cause a substantially horizontal inward (towards each other) or outward (away from one another) movement of one or both draft links for executing a simplified and mechanized coupling or uncoupling operation, respectively. For each draft link, the coupling elements are a horizontally-disposed coupling stub preferably secured to the implement and extending laterally outwardly and a bored ball joint preferably carried by the draft link and adapted to slide onto or off said stub. The coupling process of the precedingly-discussed prior art, along with the noted disadvantages, namely the requirement of large free space around the coupling stub, manual operation, additional quick coupling frame, etc., is thus entirely eliminated;

(b) Subsequent to the coupling operation, disconnecting the hydraulic pump from the hydraulic control circuit and maintaining the pressurized fluid in communication between the two hydraulic cylinders to thereby lock the two draft links with respect to said coupling stubs against any lateral swinging motion relative to one another, but to permit free swinging thereof in unison to make possible an unrestricted lateral movement of the implement with respect to the tractor;

(c) Subsequent to the coupling operation, disconnecting the hydraulic pump from the hydraulic control circuit, capturing pressurized hydraulic fluid within the conduit system leading to the hydraulic cylinders and directing the hydraulic fluid between the two cylinders through a conduit portion where the fluid is separated by a piston reciprocable between predetermined limits for the purpose of restricting the free swinging motion set forth under (b) to a swinging motion of limited amplitude;

(d) Subsequent to the coupling operation, disconnecting the hydraulic pump from the hydraulic control circuit, capturing pressurized hydraulic fluid within the conduit system leading to the hydraulic cylinders and separating the hydraulic fluid between the two cylinders to prevent any lateral swinging motion of both draft links from any desired lateral position. This feature obviates the necessity of using rigidizing frames when, e.g., it is required that the implement follow the tractor in a preset lateral position thereto without any lateral displacement.

According to a further inventive feature, appropriate hydraulic conduits are provided with portions of restricted cross section to brake the flow of hydraulic fluid therethrough and thus dampen the lateral motion in unison of the draft links.

Further objects and advantages will become more apparent and the inventive structural and operational features will be better understood from the ensuing detailed specification of a preferred embodiment and its variations taken in conjunction with the drawing.

BRIEF DESCRIPTION OF THE DRAWINGS

FIG. 2 is a sectional plan view of a valve block including elements shown in FIG. 1;

FIG. 3 is an external plan view of the valve block shown in FIG. 2 carrying manual operating means;

FIG. 4 shows the valve position for coupling the left draft link;

FIG. 5 shows the valve position for coupling the right draft link;

FIG. 6 shows the valve position for free lateral motion in unison of the draft links;

FIG. 7 shows the valve position for limited lateral movement in unison of the draft links; and FIG. 8 shows the valve position for locking the draft links against any lateral movement.

DESCRIPTION OF THE STRUCTURE OF THE PREFERRED EMBODIMENT

Figure 1:
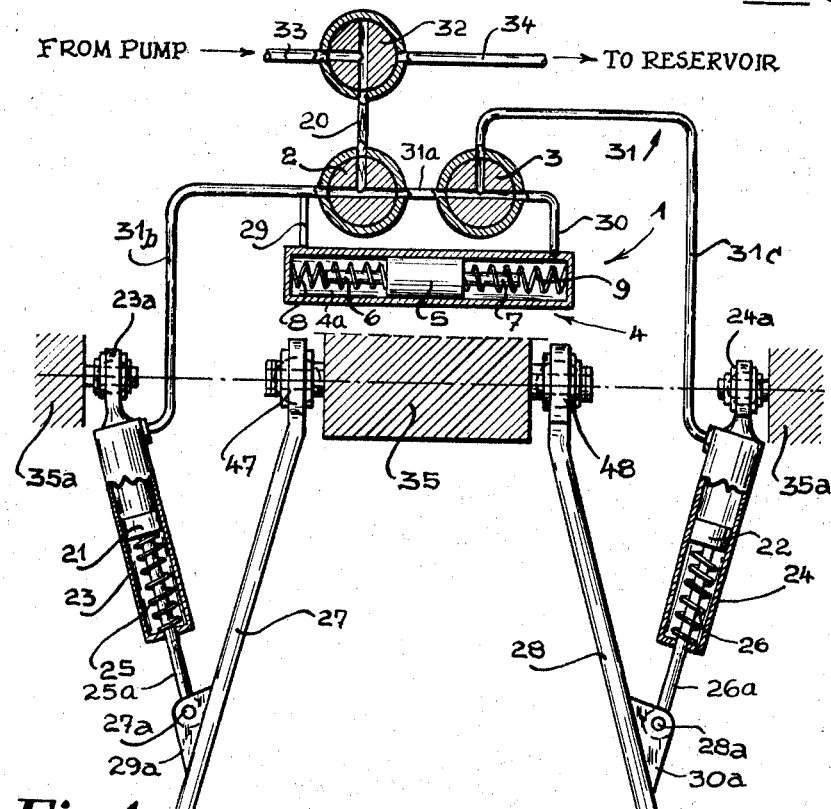
FIG. 1 is a schematic, partially sectional, plan view of a preferred embodiment of the invention.

Turning now to FIG. 1, there are schematically shown at 35 and 35a the rear portions of a tractor. To part 35 there are attached, by means of ball joints 47 and 48, the leading ends of the draft links 27 and 28 of a three-point hitch, the upper control link of which is not shown and may, in some cases, be entirely omitted.

The trailing ends of draft links 27 and 28 are adapted to be attached by means of respective ball joints 36 and 37 to the schematically shown working implement 19 which is provided with laterally extending coupling stubs 41 and 42. In the coupling position of the draft links shown in FIG. 1, the stubs 41 and 42 extend through the respective bores 38 and 39 of ball joints 36 and 37.

With ball joints 36 and 37 there is connected a respective conically-shaped guide shells 43, 44, the open side of which faces the conically-tapered respective stub 41, 42. The guide shells 43 and 44 serve to facilitate the coupling process for the tractor operator as will become more apparent hereinafter.

Two hydraulic cylinders 23 and 24 are attached to tractor part 35a by means of ball joints 23a and 24a, respectively. Ball joints 23a, 24a, 47, and 48 are preferably disposed along a common center line. Within each cylinder 23 and 24 there is disposed with sealing fit a respective reciprocable piston 21 and 22 integral with a respective piston rod 25a and 26a. These piston rods extend coaxially beyond their respective cylinders and carry at their end a respective stub 27a, 28a extending normal to the respective rods 25a, 26a. Stubs 27a, 28a are received in an opening of a respective linkage plate 29a, 30a secured to respective draft link 27, 28 and extending laterally thereto. Pistons 21 and 22 are biased by respective compression springs 25 and 26 urging the pistons to assume a position of deepest penetration in respective cylinders 23 and 24. The respective springs 25 and 26 are shown in FIG. 1 as being disposed inside the cylinders 23 and 24. It will be apparent to those skilled in the art that the spring means may also be externally applied.

A hydraulic conduit system, generally indicated at 31, is connected by means of branch conduits 31b and 31c to that side of respective hydraulic cylinders 23 and 24 which is adjacent to the respective ball joints 23a and 24a. The hydraulic conduit system 31 is connected with a hydraulic supply conduit 20 which, in turn, is connected to the hydraulic system (not shown) of the tractor through a three-way valve 32, preferably operable from a tractor seat. Valve 32 may selectively connect the supply conduit 20 either with the conduit 33 communicating with an oil pump (not shown) of the hydraulic system of the tractor, or with a conduit 34 communicating with a reservoir (not shown) of the same system. In a third position of valve 32, the conduit 33 communicates with the conduit 34 while the conduit 20 is shut-off therefrom.

System 31 includes serially connected three-way valves 2 and 3 disposed between branches 31b and 31c with the interposition of conduit 31a. The branch conduit 31b connects the valve 2 with cylinder 23, while branch conduit 31c connects the valve 3 with cylinder 24.

Parallel with valves 2 and 3, as well as with branch conduit 31a, there is provided a by-pass generally indicated at 4 which is connected to branch conduits 31b and 31c by means of respective conduits 29 and 30. The by-pass 4 includes a cylindrical chamber 4a in which there is reciprocably disposed with a sealing fit a piston 5.

Turning now to FIG. 2, there is shown a valve block 1 including in unitary structure valves 2 and 3, conduit 31a (interconnecting the two valves) and the by-pass 4 (comprising conduits 29, 30 and cylindrical chamber 4a containing the displaceable piston 5). The valve block 1 further includes a port 12 connectable to the supply conduit 20 and ports 13 and 14, respectively, connectable to branch conduits 31b, 31c.

From either end of displaceable piston 5 there extends, substantially coaxially with the longitudinal axis of chamber 4a, two respective studs 6 and 7. The purpose of studs 6 and 7 is to limit the displacement of piston 5 by abutting, as the case may be, against the inner face of respective cap screws 10 and 11 closing off the two ends of chamber 4a. Instead of being part of piston 5, the studs 6 and 7 may be, as an alternate solution, rigidly secured to the respective cap screws 10 and 11.

Surrounding studs 6 and 7 and engaging piston 5 are respective return springs 8 and 9, the outer respective end of each of which is seated against the inner face of respective cap screws 10 and 11. Upon displacement of piston 5, the return springs 8 and 9 tend to shift the piston into its central position.

Turning now to FIG. 3, the rotor of valve 2 is connected to an operating knob 17, while that of valve 3 is associated with knob 18. To knob 17 there is fixedly secured a locking disc 15 having a substantially circular outline provided, at 90° to the left from the position shown in FIG. 3, with a circular cut-out having the same radius as the outline of locking disc 16 associated with knob 18. The locking disc 16 is also provided with a circular cut-out which, in the position of valve 3 shown in FIGS. 1 and 2, lockingly engages the outer edge of disc 15. It is seen in FIG. 3 that in this position knob 18 cannot be rotated. The purpose of mutually locking one knob with respect to the other will become more apparent from the description of the operation.

At least one of conduits 29 and 30 may be provided with a permanently or adjustably restricted cross section to brake the flow of hydraulic fluid therethrough. Also, conduit 31a may be provided with such a restricted cross section for the same purpose. This last-named restriction is designated at 32a in FIG. 2. The purpose of braking the flow will also become more apparent as the description progresses.

DESCRIPTION OF OPERATION OF THE PREFERRED EMBODIMENT (1) *Coupling and uncoupling process with simultaneously swinging draft links*

It is now supposed that the tractor operator wishes to couple the draft links 27 and 28 with the respective stubs 41 and 42 of the implement 19. The trailing ends of these draft links are, in their pre-coupling position, farther apart than the distance between the outer ends of stubs 41 and 42. It is further assumed that the tractor 35 and the implement 19 are both positioned on a plane ground surface so that the axis of the bores 38 and 39 of the respective ball joints 36 and 37 may readily be brought into substantial alignment with the common axis of stubs 41 and 42 by backing the tractor towards the implement 19 and by lifting the draft links 27 and 28 by means of the hydraulic system of the tractor.

Valves 2 and 3 are set to establish communication between the supply conduit 20 and the branch conduit 31b on one hand, and between the supply conduit 20 and the branch conduit 31c on the other hand. This position of valves 2, 3 and 32 is depicted in FIG. 1 from which it is further seen that the entire conduit system 31, by-pass 4 and cylinders 23, 24 are submitted to a hydraulic pressure generated by the hydraulic pump (not shown). The position of knobs 17 and 18 associated with the respective valves 2 and 3 is in "couple" and "free," respectively (FIG. 3). In order to initiate the inwardly swinging motion of both draft links 27, 28, after knobs 17, 18 have been set as outlined in order to select the respective positions of valves 2 and 3, valve 32 is now set by the operator to establish communication between the supply conduit 20 and conduit 33 connected to the hydraulic pump. Consequently, pressurized hydraulic fluid flowing from conduit 33 into supply conduit 20 enters, on the one hand, branch conduit 31b, cylinder 23 and, on the other hand, conduit 31a, branch conduit 31c and cylinder 24. The hydraulic pressure in cylinders 23 and 24 causes the respective pistons 21 and 22 to be displaced against the force of respective springs 25 and 26, and, as a consequence, the draft links 27 and 28 will swing towards each other. During the course of this swinging motion the stubs 41 and 42 will be introduced into the respective guide shells 43 and 44 and, due to the usual less than perfect axial alignment between bore 38, 39 and the respective coupling stub 41, 42, the tapered ends thereof will contact the inner marginal portions of guide shells 43 and 44. A continued inward swing of the draft links 27 and 28 will cause stubs 41 and 42, guided by respective shells 43 and 44, to be introduced into the respective bores 38 and 39. The ball joints 36 and 37, containing the respective bores 38 and 39, will align themselves with the axis of the stubs 41 and 42. For further facilitating the final coupling, the inwardly directed end portions of bores 38 and 39 may be provided with a conical counterbore (not shown), in which case it is not necessary to taper the ends of stubs 41 and 42.

After full introduction of the stubs into the respective bores, knob 17 is turned 180° to "secured" whereby valve 2 shuts off supply conduit 20 from conduits 31a and 31b, maintaining, however, communication between conduits 31a and 31b. Thus, the hydraulic fluid is captured withinin conduit system 31 as well as cylinders 23 and 24. As a consequence, the draft links are immobilized with respect to one another and the ball joints 36 and 37 are locked with their associated stubs 41 and 42 in the coupling position. In addition to turning knob 17 to "secured," the three-way valve 32 may preferably, but not necessarily, be turned clockwise 90° from its position shown in FIG. 1, shutting off the supply conduit 20 from the hydraulic pump conduit 33.

In the coupled position of draft links 27, 28 shown in FIG. 1, springs 25, 26 associated with the respective cylinders 23 and 24 are only partly compressed as may be seen from FIG. 1, for the purpose which will be apparent from the description hereinafter.

To allow a simultaneous outward swinging motion (away from one another) of the draft links for executing the uncoupling operation, first knob 17 is turned back to "couple," while the setting of valve 3 is not changed; knob 18 associated with valve 3 remains in "free." Then, in order to initiate the simultaneous outward swinging motion of the draft links 27, 28, the valve 32 is set to establish communication between conduits 20 and 34, the latter being connected to a reservoir (not shown). The hydraulic fluid in cylinders 23 and 24 no longer resists the force of respective springs 25 and 26 and as a result, pistons 21 and 22 move into their respective cylinder displacing the hydraulic fluid which is freely drained through conduits 20 and 34. The released springs 25 and 26 also cause draft links 27 and 28 to swing outwardly whereby disengagement occurs between the respective stub 41, 42 and bore 38, 39.

*(2) Two-step coupling process with individually swinging draft links*

At the beginning of a coupling process it may happen, e.g. in case the tractor 35 and the implement 19 do not rest on a plane ground surface, that one of the guide shells 43 and 44 secured to the draft links 27 and 28, respectively, is, before the swinging motion of the draft links towards each other, in an unfavorable position with respect to the associated respective stubs 41 and 42. Consequently, as the swinging motion of the draft links is in progress, the stub either does not find its way into the cavity of the guide shell or is not conveniently directed towards the bore of the associated ball joint 36, 37. This might be the case when the axis of the stubs 41 and 42 is accidentally at an excessively acute angle to the axis extending through the center of ball joints 36 and 37. In such a case it would be complicated to maneuver the tractor so as to obtain a favorable position for the simultaneous coupling of both draft links. In such cases a two-step coupling process is resorted to, as it will be described hereinafter.

It is assumed that the tractor operator was able to bring, e.g. the guide shell 44 of the draft link 28 into a substantially accurate alignment with the associated stub 42, whereas such a favorable position for the guide shell 43 was not possible to obtain with respect to stub 41. Thus, guide shell 43 is substantially out of alignment with respect to stub 41. First, the operator restricts the coupling process to a single side (that of the draft link 28). It is further assumed that, at the beginning of the operation, valves 2 and 3 are set as shown in FIGS. 1 and 3 so that communication is established between the supply conduit 20 and the branch conduit 31b on the one hand, and between the supply conduit 20 and the branch conduit 31c on the other hand. Consequently, knobs 17 and 18 associated with the respective valves 2 and 3 are in "couple" and "free," respectively. This setting of valves 2 and 3 and respective knobs 17 and 18 may be deemed to be the normal setting which will preferably be chosen at the beginning of a coupling operation.

Since it is assumed that guide shell 44 of the draft link 28 is in a substantially accurate alignment with the associated stub 42 so that draft link 28 may readily be coupled with stub 42, the operator now turns knob 17 from "couple" to "right" to set valve 2 into its position shown in FIG. 5. Consequently, on the one hand, branch conduit 31b associated with cylinder 23 is shut off from supply conduit 20, and on the other hand, communication is established between supply conduit 20 and conduit 31a. Since valve 3 is in the position shown in FIGS. 1 or 5 (knob 18 associated with valve 3 is in "free," as shown in FIG. 3), there is also communication between branch conduit 31c and supply conduit 20.

Now the operator sets valve 32 in the position shown in FIG. 1 to establish communication between the conduit 33 connected to the hydraulic pump and the supply conduit 20 so that hydraulic fluid freely flows through conduit 20 via valve 2 into conduit 31a and via valve 3 into branch conduit 31c and further into cylinder 24. The hydraulic pressure in cylinder 24 causes the piston 22 to be displaced against the force of the spring 26 and, as a consequence, the draft link 28 will swing inwardly towards stub 42. During the course of this swinging motion draft link 28 is brought into its coupled position on stub 42 as outlined above in section (1) and as shown in FIG. 1.

When the engagement between the trailing end of draft link 28 and the stub 42 is completed, pressurized fluid flowing from the pump via conduits 20, 31a and 31c is still acting on piston 22 and consequently the draft link 28 is locked in its coupled position with respect to stub 42.

During the coupling operation of draft link 28, draft link 27 was not affected by the flow of pressurized fluid within the conduit system due to the setting of valve 2 as shown in FIG. 5. Consequently, guide shell 43 is still out of alignment with respect to stub 41 and will generally be in a position outside of stub 41 spaced apart therefrom. Therefore, the operator now maneuvers the tractor and/or raises draft link 27 in order to substantially align guide shell 43 with respect to stub 41. As soon as this is achieved, the operator turns knob 17 so as to bring valve 2 from the position shown in FIG. 5 into the position shown in FIG. 4. This is accomplished by turning knob 17 from "right" via "couple" to "left." Consequently, communication between conduits 33, 20 and 31a, 31c is interrupted so that pressurized hydraulic fluid is captured in conduits 31a, 31c and cylinder 24 so that draft link 28 remains locked with respect to stub 42. Furthermore, the setting of valve 2 into the position shown in FIG. 4 establishes communication between conduits 33, 20 and branch conduit 31b as well as cylinder 23. Since the setting of valve 32 preferably remains unchanged after coupling of the draft link 28 has been completed, turning of knob 17 from "right" to "left" as soon as alignment of guide shell 43 with respect to stub 41 is achieved, results in pressurized hydraulic fluid immediately flowing into branch conduit 31b and cylinder 23. The pressurized hydraulic fluid entering cylinder 23 displaces piston 21 against the compressive force of the spring 25. Thus, the draft link 27 swings inwardly and the guide shell 43 receives stub 41 which is, as the swinging motion of draft link 27 continues, finally received by bore 38 of ball joint 36, until the respective parts reach their coupled position.

The operation is terminated by turning knob 17 to "secured," shutting off supply conduit 20 from conduit system 31. Valve 32 may either be left in the position shown in FIG. 1 or is preferably turned clockwise 90° from that position into a position wherein conduits 33 and 34 communicate while supply conduit 20 is shut off.

It is to be well understood that the proceedingly-described coupling operation may also be carried out when first the draft link 27 is coupled to the implement 19. In this case, however, knob 17 is first turned to "left" establishing communication between cylinder 23 and supply conduit 20 via branch conduit 31b, while at the same time conduit 31a and consequently conduit 31c and cylinder 24 are shut off from supply conduit 20. The respective positions of valves 2 and 3 are shown in FIG. 4. After having selected the aforestated position of valve 2, the operator sets valve 32 into the position shown in FIG. 1 in order to start the inwardly directed swinging motion of draft link 27 into its coupling position on stub 41. As soon as coupling of draft link 27 is completed, alignment of draft link 28 with respect to stub 42 is achieved by maneuvering the tractor 35 and/or by lifting draft link 28. Then the operator turns knob 17 from "left" 180° via "couple" into "right." Since valve 32 still is in the position shown in FIG. 1 establishing communication between conduit 33 and supply conduit 20, the draft link 28 is swung inward towards stub 42 as soon as knob 17 reaches the position "right," valve 2 allowing pressurized fluid to flow from supply conduit 20 via conduit 31a, valve 3 and conduit 31c into cylinder 24 to displace piston 21. As soon as the trailing end of draft link 28 is coupled with stub 42, the operation is terminated by turning knob 17 from "right" to "secured" shutting off supply conduit 20 from conduit system 31 and thus capturing pressurized fluid within conduit system 31 so as to lock the trailing ends of draft links 27, 28 in their respective coupled positions on stubs 41 and 42.

Uncoupling of draft links 27, 28 is performed as described in section (1), by turning knob 17 from "secured" back to "couple" in order to select the respective position of valve 2 so as to establish communication between cylinder 23, branch conduit 31b and supply conduit 20. It is to be noted that the setting of valve 3 was not changed during the two step coupling operation of draft links 27, 28 so that valve 3 is still in the position shown in FIG. 1 establishing communication between cylinder 24 as well as branch conduit 31c and conduit 31a. Since valve 2 has been turned by the operator into the position shown in FIG. 1, communication is also established between cylinder 24, conduits 31c, 31a and 20. Now the operator turns valve 32 so as to establish communication between supply conduit 20 and conduit 34 leading to the reservoir (not shown) while conduit 33 is shut off. Consequently, the pressurized hydraulic fluid contained within the conduit system 31 and within cylinders 23 and 24 is freely drained to the reservoir. Thus, due to the force exerted by the compressed springs 25, 26 draft links 27, 28 return to their uncoupled position wherein they are spaced apart from the respective stubs 41, 42 of the implement 19.

(3) *Free swinging motion of the draft links in unison*

After the implement 19 has been coupled to the tractor 35 either by a one-step or by a two-step coupling operation, as described above, it may be desired that the implement be capable of free lateral displacement upon the action of an externally applied force. A free horizontal swing in unison of the draft links 27 and 28 is selected by the operator, after knob 17 had been turned to "secured" at the end of the coupling operation of draft links 27, 28 by leaving knob 18 in "free" so that valves 2 and 3 are in a position shown in FIG. 6. Stated in different terms, in order to adapt the system for free swinging motion of both draft links in unison, no further manipulation by the operator is required after coupling has been completed by turning knob 17 to "secured." The hydraulic portions of cylinders 23 and 24 are in direct communication, and, as a consequence, any motion of one of the pistons 21 or 22 will cause, by displacing the passive hydraulic fluid therein, a motion of similar extent, but of opposite direction, of the other piston. Thus, the draft links 27 and 28 will move simultaneously in the same direction. The amplitude of free horizontal swing is limited only by the structure of joints and related connecting parts. A free lateral swing is particularly desirable for hoeing machines which usually have their own steering mechanism.

(4) *Limited swinging motion of the draft links in unison*

At times, e.g. during plowing operations, it is undesirable that the implement hitched to the tractor have an unrestricted freedom of lateral displacement, while a lateral movement thereof of a restricted amplitude is deemed advantageous.

Thus, to change the free horizontal swinging motion of the draft links 27 and 29 (as described under (3)) to a swinging motion of smaller amplitude, valve 3 is brought into the position shown in FIG. 7 by rotating knob 18 to "limited." It is noted that knob 18 associated with valve 3 is now freely rotatable, since at the end of the coupling operation knob 17 has been turned into its "secured" position and, as may be inferred from FIG. 3, disc 16 of knob 18 is no longer locked by disc 15. In the valve position of FIG. 7, communication between the branch conduits 31a and 31c is interrupted. Consequently, the hydraulic fluid in the two cylinders 23 and 24 is no longer in direct communication with one another (as was the case for the free swinging in unison) but have to interact through the by-pass 4. Here the hydraulic fluid is separated by the piston 5 slidably and sealingly disposed in the cylindrical chamber 4a.

If, for example, the implement 19 is exposed to an external force directed to the left, the draft link 27 swings to the left. Piston 21 will be displaced within cylinder 23 and consequently the tension of spring 25 is partly reduced. The displacement of piston 21 will urge the hydraulic fluid from the left against the piston 5 which will be displaced towards the right until the stud 7 abuts against the end face of cap screw 11. As the piston 5 is displaced towards the right, the hydraulic fluid, acting through conduits 30 and 31c, causes piston 22 to move outwardly further tensioning (compressing) spring 26. As a result, the draft link 28 will swing to the left in unison with draft link 27. The shifting to the right of the hydraulic fluid in the conduit system 31 continues as long as piston 5 is free to move. At the moment of abutment of stud 7 against the inner face of cap screw 11, the fluid is immobilized and thus the draft links have reached their extreme left position. Similarly, the simultaneous motion of the draft links 27 and 28 to the right and the generated leftward shift of the hydraulic fluid will be arrested when stud 6 abuts against the inner face of cap screw 10.

As soon as the external force directed to the left is no longer exerted on the implement 19, spring 26 within cylinder 24 which was compressed to a greater extent than spring 25 within cylinder 23 will urge piston 22 to displace fluid from within cylinder 24 which, in turn, causes displacement of piston 21 within cylinder 23 which results in compressing spring 25. During compressing, spring 25 will absorb part of the displacement forces. Draft links 27, 28 come to rest as soon as the displacement forces are entirely consumed by repeated compressing and releasing of springs 25, 26.

It is seen that the amplitude of horizontal swing of the draft links 27 and 28 is limited by the path of reciprocation of piston 5 and by the volume of hydraulic fluid displaced by the shifting of piston 5. The amplitude of the limited swing may, for example, be varied by using another set of cap screws 10 and 11 whose inner face is closer to or more remote from the end of the respective stud 6 or 7. It is obviously within the scope of the invention to secure studs 6 and 7 to the inner face of the respective cap screw 10, 11 instead of affixing them to the piston 5 as set forth hereinabove and shown in FIG. 2.

It is seen that piston 5 is a passive element serving to separate the hydraulic fluid in chamber 4a and to transmit the motion of the fluid in one side of the chamber 4a to that in the other side.

With the proper selection of the force of springs 8 and 9 relative to that of springs 25 and 26, piston 5 may be given an additional, active centering function tending to return the implement into its central position after it has been laterally displaced by an externally acting force. This may be particularly advantageous in plows where it is a desideratum to lower the temporarily raised implement into the soil always in the same position with respect to the tractor.

(5) *Locking the draft links against any lateral swinging motion*

If it is desired to immobilize the implement in any lateral position, the valve 3 is brought into the position shown in FIG. 8 by turning knob 18 to "locked" (FIG. 3). It is again noted that knob 17 has been previously set to "secured" as the terminal step of the coupling process. In the valve position of FIG. 8, the branch conduit 31c does not communicate with either conduit 30 or 31a. Thus, the hydraulic fluid is immobilized in both cylinders 23 and 24 and consequently neither of pistons 21 and 22 may move inwardly. Thus, in whatever lateral position the draft links 27 and 28 are found during the course of their lateral swing in unison with the coupled implement 19, a turning of knob 18 to "locked" will "freeze" them in that position against any further lateral displacement.

(6) *Dampening the lateral swing of the draft links*

For certain implements, for example heavy plows, it is useful to dampen the limited lateral motion of the draft links 27 and 28 in order to avoid the breaking of the draft links or the respective hydraulic cylinders 23 and 24 during the swinging motion of the implement, particularly when it reaches one of the extreme positions of its possible lateral mobility. For this purpose, as shown in FIG. 2, there is provided in the by-pass 4 at least one of conduits 29 and 30 with a restricted cross section. Thus, when the volume of the hydraulic fluid locked in either side of piston 5 is displaced toward the right or the left as a consequence of an external force acting on the implement 19, the lateral motion of the draft links will be dampened due to the braking effect the said restriction has on the shifting fluid.

A similarly working dampening effect may be achieved even when the draft links are not limited in their lateral movement in unison. For this purpose the conduit 31a is provided with a portion of restricted cross section designated at 32a in FIG. 2. Obviously, it is possible to provide means whereby the above-noted restricted cross sections may be varied in order to adjust the dampening effect according to requirements.

MODIFICATIONS OF THE PREFERRED EMBODIMENT

The preferred embodiment described in detail hereinbefore may be modified and simplified in a number of ways without departing form the scope of the invention.

In a simplified embodiment described hereinafter the by-pass 4 is entirely eliminated and, consequently, the feature providing a swing in unison of limited amplitude of the draft links 27 and 28 is absent.

Figure 1A:
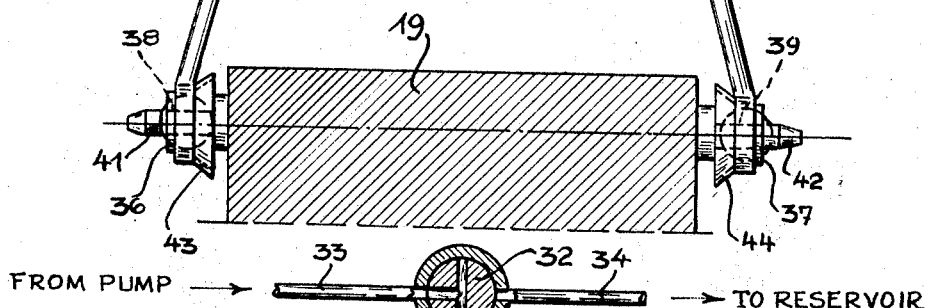
FIG. 1a shows a modification of the valve assembly of FIG. 1.

Turning now to FIG. 1a, there is shown a valve assembly replacing that of the preferred embodiment. The branch conduits 31b and 31c are connected, similarly to the embodiment of FIG. 1, to respective hydraulic cylinders 23 and 24. Further, the portions shown in FIG. 1 but omitted from FIG. 1a are also maintained in this simplified embodiment with the exception of by-pass 4. As seen in FIG. 1a, the three-way valves 2 and 3 of FIG. 1 are replaced by simple one-way, shut-off valves 2a and 3a. The supply conduit 20a is connected at one end to three-way valve 32 similarly to FIG. 1, but joins at its other end the conduit 31a disposed between the valves 2a and 3a. In the position shown in FIG. 1a, the valve 32 establishes communication between a hydraulic pump (not shown) and supply conduit 20a through conduit 33. Since both valves 2a and 3a are open, the hydraulic pressure is admitted through conduits 31b and 31c to both cylinders 23 and 24. Draft links 27 and 28 will thus move simultaneously towards one another to execute a coupling operation identical to that described under (1) of the operation of the preferred embodiment. Upon completion of the coupling process, valve 32 is rotated 90° clockwise in order to interrupt communication between the cylinders on the one hand and the hydraulic pump or reservoir on the other hand, capturing the hydraulic fluid in the conduit system 31 and in cylinders 23 and 24. Thus, the trailing ends of both links 27, 28 are locked on the respective stub shafts 41, 42 of the implement 19. Nevertheless, in the position of valves 2a and 3a shown in FIG. 1a, the two draft links 27 and 28 are freely swingable in unison, a result identical to that described under (3) of the operation.

If, on the other hand, it is desired to lock the implement 19 in a predetermined lateral position with respect to the tractor, it is sufficient, when the implement is in the desired position, to turn one of the valves 2a or 3a by 90° so that a flow of hydraulic fluid from one cylinder to the other may not take place and, consequently, the pistons 21 and 22 are "frozen" in their position in cylinders 23 and 24, respectively. It is apparent that prior to operating valves 2a or 3a, the valve 32 is turned to shut off the supply conduit 20a from the hydraulic pump and the reservoir. For uncoupling the implement 19 from the tractor 35, the valves 2a and 3a are brought back into the position shown in FIG. 1a while the valve 32 is turned into a position 180° from that shown in FIG. 1a so that communication is established through conduit 34 between the supply conduit 20a and a reservoir (not shown). The hydraulic fluid will flow from the cylinders 23 and 24 into the reservoir, the return springs 25 and 26 will displace the respective pistons 21 and 22 causing the draft links 27 and 28 to swing in opposite directions away from implement 19.

The valve assembly shown in FIG. 1a is also adapted to execute a two-step coupling operation similar to that discussed under (2) of the operation. It is assumed that before the beginning of the coupling operation valve 32 in FIG. 1a is in a position wherein communication is established between conduits 33 and 34 while supply conduit 20a is shut off. It is further assumed that the draft links 27, 28 are in a position of maximum lateral separation, and valves 2a, 3a are in a position shown in FIG. 1a. Because of the reasons set forth in section (2) the operator, e.g. by maneuvering the tractor, tries to align either one of guide shells 43, 44 associated with the respective draft links 27, 28 with either one of the respective stubs 41, 42. It is supposed that the operator was able to properly align the guide shell 43 with respect to stub 41 so that draft link 27 may readily be brought from its spaced-apart position into its coupled position with the implement 19. In order to prepare the conduit system for the coupling of draft link 27 the operator turns valve 3a by 90° from the position shown in FIG. 1a into a position wherein supply conduit 29a and conduit 31a are shut off from the branch conduit 31c. It is noted that valve 2a is in the position shown in FIG. 1a establishing communication between supply conduit 20a and conduit 31a on the one hand, and conduit 31b as well as cylinder 23, on the other hand. Now the operator turns valve 32 into the position shown in FIG. 1a establishing communication between conduit 33 connected to the pump (not shown) and cylinders 23 via valve 32, supply conduit 20a, conduit 31a, valve 2a, and branch conduit 31b. As soon as the valve 32 has been turned into the position shown in FIG. 1a, pressurized hydraulic fluid enters supply conduit 20a and flows into cylinder 23 displacing piston 21 against the compressive force of spring 25 so as to urge piston rod 25a out of cylinder 23. Consequently, the trailing end of draft link 27 swings inwardly towards stub 41, and as the swinging motion of draft link 27 continues, stub 41 enters guide shell 43 and bore 38 until the respective parts have reached their final coupled position as shown in FIG. 1.

Now the operator, in order to lock the respective parts of the trailing end of draft link 27 in its coupled position, turns valve 2a from the position shown in FIG. 1a by 90° into a position wherein branch conduit 31b is shut off from conduits 31a, 20a and 33. Thus, pressurized hydraulic fluid is captured within branch conduit 31b and within cylinder 23 locking draft link 27 in its coupled position on stub 41. Preferably, but not necessarily, the operator may also turn valve 32 into a position wherein conduits 33 and 34 communicate while supply conduit 20a is shut off.

After locking draft link 27 in its coupled position with respect to the implement 19, the operator, for example, by maneuvering the tractor, tries to align guide shell 44 with respect to stub 42. As soon as alignment between the respective parts is achieved, the operator turns valve 3a back to the open position shown in FIG. 1a establishing communication between cylinder 24, branch conduit 31c, conduit 31a and supply conduit 20a. In order to start the inwardly swinging motion of draft link 28 valve 32 is now turned into the position shown in FIG. 1a so that conduits 33 and 20a communicate, thus allowing pressurized hydraulic fluid to flow from the pump (not shown) through conduit 33 into cylinder 24 via supply conduit 20a, conduit 31a and conduit 31c. It is to be noted that turning of valve 32 into the position shown in FIG. 1a is not required in case valve 32 is left in the position shown in FIG. 1a at the end of the coupling operation of draft link 27. The pressurized hydraulic fluid entering cylinder 24 displaces piston 22 against the force of the compression spring 26 and urges piston rod 26a outwardly from cylinder 24. Consequently, the trailing end of draft link 28 is swung inwardly from its aligned spaced-apart outward position towards stub 42. A continued inward swing of the trailing end of draft link 28 causes stub 42 to enter guide shell 44 and finally bore 39 until the respective parts reach their coupled position wherein they are locked by the pressurized fluid still acting on piston 22. The operation is terminated by turning valve 3a from the position shown in FIG. 1a by 90° into its closed position so as to capture the pressurized hydraulic fluid within branch conduit 31c and cylinder 24. Thus, draft link 28 is locked in its coupled position with respect to stub 42. At the end of the coupling operation, the operator may also turn valve 32 so as to establish communication between conduits 33 and 34 while supply conduit 20a is shut off. It is to be noted that at the end of the coupling operations of draft links 27 and 28 valves 2a and 3a have been closed to capture the pressurized hydraulic fluid within branch conduit 31b and cylinder 23, on the one hand, and within branch conduit 31c and cylinder 24, on the other hand. Thus, draft links 27, 28 are locked against any lateral swinging motion as outlined in section (5) of the operation.

If, however, locking of the draft links against any lateral swinging motion is undesirable in view of the working requirements, the operator may turn valves 2a and 3a into their positions shown in FIG. 1a so as to allow free passage of fluid from cylinder 23 to cylinder 24 and vice versa permitting free swinging motion of the draft links in unison. It is to be noted that in this case valve 32 stays in the position wherein conduits 33 and 34 communicate while supply conduit 20a is shut off.

Instead of using two valves 2a and 3a, it will be apparent to those skilled in the art that it is also feasible to use a single three-way valve disposed at the junction of conduit 20a with conduit 31a.

It is apparent that in case of a valve assembly simplified in accordance with the foregoing, a control panel of the structure according to FIG. 3 is not applicable.

Independently of the valve assembly a number of other features of the preferred embodiment of FIG. 1 may be modified without departing from the spirit of the invention.

Thus, the operation of cylinders 23 and 24 may be reversed by disposing the springs 25 and 26 within or outside that part of the respective cylinders 23 and 24 which is adjacent to the tractor 35 and by connecting the branch conduits 31b and 31c to that end of the two cylinders which is adjacent to respective joints 27a and 28a. In this case, for the coupling process the springs 25 and 26 will move the draft links towards one another (pistons 21 and 22 are pushed outwardly by the respective springs 25 and 26), causing thereby a drainage of the hydraulic fluid from the cylinders into the reservoir. For uncoupling, hydraulic pressure will be introduced through the conduits 31b and 31c into the respective cylinders 23 and 24 causing a swinging motion of the draft links away from one another. It is seen that due to the aforenoted reversal of parts, an introduction of hydraulic fluid into and withdrawal thereof from the cylinders results in a swinging motion of the draft links reverse to that described in connection with FIG. 1.

It is further to be understood that instead of the aforenoted simple cylinders 23 and 24, double acting hydraulic cylinders may be used for effectuating the hydraulic means both the inward and the outward swinging motion of the draft links. The necessary suitable arrangement of the hydraulic interconnection between the double acting cylinders, as well as the appropriate valve assemblies for the control of the draft links to operate as described precedingly under (1)–(6), is, in view of the teachings of this invention, deemed to be obvious to those skilled in the art.

That which is claimed is:

1. In a hitch of the type including at least two substantially horizontally spaced draft links each connected swivelably at their leading end with a towing means such as a tractor and connectable swivelably at their trailing end to a towed means such as an agricultural implement, the improvement comprising:
   (A) a plurality of coupling means for attaching the trailing end of each of said links to said towed means, each coupling means including
      (1) a first separable means defining an elongated coupling stub extending substantially horizontally and
      (2) a second separable means defining a bore into which said stub is adapted to slide to assume a coupled position, one of said first and second separable means affixed to said towed means and the other of said first and second separable means affixed to said trailing end of said link, the axis of said stub and said bore being substantially normal to the forward direction of travel of said tractor in said coupled position,
   (B) a plurality of hydraulic cylinder means at least one of which attached to each of said links and to said towing means, said cylinder means including
      (1) a hydraulic cylinder,
      (2) a piston reciprocable within said cylinder and
      (3) a piston rod affixed to said piston and projecting from said cylinder,
   (C) hydraulic conduit means connecting each of said cylinders to hydraulic pump means and to drainage means and
   (D) valve means in said conduit means adapted to be set into a first position connecting said pump means with said cylinders to allow displacement of said pistons in a first direction, said valve means adapted to be set into a second position connecting said drainage means with said cylinders to allow displacement of said pistons in a second direction, said displacements of said pistons causing a lateral, simultaneous and oppositely directed swinging motion of said draft links.

2. A hitch as defined in claim 1, including a conical guide shell secured to and surrounding each of said second separable means to facilitate the introduction of said stub into said bore.

3. A hitch as defined in claim 1, wherein said second separable means is a ball joint.

4. A hitch as defined in claim 3, wherein said stub is rigidly secured to said implement and extends laterally therefrom, said ball joint is swivelably secured to said trailing end of said draft link.

5. A hitch as defined in claim 1, wherein said valve means is adapted to be set into further positions to shut off any selected one of said cylinders from both said pump and said drainage means while establishing communication between the other of said cylinders and said pump or said drainage means selectively to allow a swinging motion of only one of said links while the other of said links remains immobile.

6. In a hitch of the type including at least two substantially horizontally spaced draft links each connected swivelably at their leading end with a towing means such as a tractor and at their trailing end to a towed means such as an agricultural implement, the improvement comprising:

(A) a plurality of hydraulic cylinder means at least one of which attached to each of said links and to said towing means, said cylinder means including
 (1) a hydraulic cylinder,
 (2) a piston reciprocable within said cylinder and
 (3) a piston rod affixed to said piston and projecting from said cylinder,
(B) hydraulic conduit means establishing communication between said cylinders,
(C) hydraulic fluid adapted to be captured in said cylinders and said conduit means and adapted to be shifted from one cylinder to the other when displaced by any one of said pistons ensuring a substantially horizontal, unidirectional swinging motion of both said draft links in unison.

7. A hitch as defined in claim 6, including a fluid dividing piston reciprocable in said hydraulic conduit means along a path of predetermined length, said piston being displaceable by pressure exerted thereto by said hydraulic fluid from either side thereof, the extent of displacement of said captured fluid being limited by said predetermined length.

8. A hitch as defined in claim 7, wherein said dividing piston is disposed in a chamber having end faces abutting means disposed between each side of said piston and said end faces defining said predetermined length.

9. A hitch as defined in claim 8, wherein said abutting means is a stud rigidly affixed to either side of said piston and extending axially therefrom.

10. A hitch as defined in claim 7 including resilient return means urging said dividing piston to assume a central position of rest.

11. A hitch as defined in claim 7, said hydraulic conduit means includes a by-pass, said dividing piston disposed in said by-pass, valve means in said hydraulic conduit means adapted to be set into a position shutting off direct communication of said fluid between said cylinders and directing said fluid solely into said by-pass, said valve means adapted to be set into a further position establishing direct communication of said fluid between said cylinders.

12. A hitch according to claim 11, wherein said by-pass includes at least one portion of restricted cross section to brake the flow of said shifting hydraulic fluid therein.

13. A hitch according to claim 6 including valve means adapted to be set into a position shutting off communication between said cylinders preventing said shifting of said fluid and immobilizing all of said pistons.

14. A hitch according to claim 6, wherein said conduit means includes at least one portion of restricted cross section to brake the flow of said shifting hydraulic fluid therein.

15. A hitch as defined in claim 1, wherein each said hydraulic cylinder includes a connecting means rigidly affixed to that end thereof which is adjacent said towing means and wherein said towing means includes connecting means rigidly affixed thereto and adapted to cooperate with said connecting means affixed to said cylinder, both said connecting means forming a ball joint.

16. A hitch as defined in claim 1 including linkage means rigidly affixed to said piston rods of said cylinders, said linkage means including a linkage stub being substantially normal to the respective one of said rods and wherein said draft links each is provided with a linkage plate intermediate the trailing and the leading ends, said linkage plates extending laterally from said draft links and having an opening adapted to receive the respective one of said linkage stubs to allow an angular movement of said linkage stubs within said openings relative to said linkage plates in a lateral direction.

References Cited

UNITED STATES PATENTS

| | | | |
|---|---|---|---|
| 2,846,018 | 8/1958 | Puckett. | |
| 3,078,930 | 2/1963 | Foote | 172—491 |
| 3,138,392 | 6/1964 | Holland | 280—460 X |
| 3,312,478 | 4/1967 | Knaapi | 172—272 X |

FOREIGN PATENTS

| | | |
|---|---|---|
| 247,922 | 11/1963 | Australia. |
| 1,483,341 | 4/1967 | France. |

LEO FRIAGLIA, *Primary Examiner.*

U.S. Cl. X.R.

172—450, 272; 280—447, 474, 460